United States Patent
Zhang et al.

(10) Patent No.: US 12,501,475 B2
(45) Date of Patent: Dec. 16, 2025

(54) METHODS AND APPARATUS OF ENHANCED CANDIDATE ALLOCATION SCHEMES FOR ENHANCED PDCCH

(71) Applicant: Lenovo (Beijing) Limited, Beijing (CN)

(72) Inventors: Yi Zhang, Beijing (CN); Chenxi Zhu, Beijing (CN); Bingchao Liu, Beijing (CN); Wei Ling, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 316 days.

(21) Appl. No.: 18/551,243

(22) PCT Filed: Mar. 22, 2021

(86) PCT No.: PCT/CN2021/082159
§ 371 (c)(1),
(2) Date: Sep. 19, 2023

(87) PCT Pub. No.: WO2022/198406
PCT Pub. Date: Sep. 29, 2022

(65) Prior Publication Data
US 2024/0205959 A1    Jun. 20, 2024

(51) Int. Cl.
H04W 72/56      (2023.01)
H04W 72/23      (2023.01)
H04L 1/08       (2006.01)

(52) U.S. Cl.
CPC ........... *H04W 72/56* (2023.01); *H04W 72/23* (2023.01); *H04L 1/08* (2013.01)

(58) Field of Classification Search
CPC .......... H04W 72/56; H04W 72/23; H04L 1/08
See application file for complete search history.

(56) References Cited

U.S. PATENT DOCUMENTS 10,863,499 B2   12/2020  Seo et al.
11,153,862 B2 * 10/2021  He .................. H04W 76/11
(Continued)

FOREIGN PATENT DOCUMENTS

CN     110149180 A    8/2019
EP      4247081 A1    9/2023
(Continued)

OTHER PUBLICATIONS

NTT Docomo, Inc., "Layer 1 enhancements for NR URLLC", 3GPP TSG RAN WG1 Meeting #94bis, R1-1811378, Chengdu, China [retrieved Aug. 8, 2023]. Retrieved from the Internet <https://www.3gpp.org/ftp/TSG_RAN/WG1_RL1/TSGR1_94b/Docs>., Oct. 2018, 18 Pages.
PCT/CN2021/082159, "International Preliminary Report on Patentability", PCT Application No. PCT/CN2021/082159, Oct. 5, 2023, 5 pages.
PCT/CN2021/082159, "International Search Report and Written Opinion", PCT Application No. PCT/CN2021/082159, Dec. 23, 2021, 6 pages.
(Continued)

*Primary Examiner* — Michael J Moore, Jr.
(74) *Attorney, Agent, or Firm* — FIG. 1 Patents (57) ABSTRACT

Methods and apparatus of enhanced candidate allocation schemes for enhanced PDCCH are disclosed. The method includes: receiving, by a receiver, configurations of a plurality of search space sets that are linked for a Physical Downlink Control Channel (PDCCH) transmission with a plurality of repetitions; wherein the plurality of repetitions of the PDCCH are transmitted on a plurality of candidates; determining, by a processor, according to a priority rule with a predefined granularity, by counting the candidates from the linked search space sets, whether there is sufficient candidate resource available for allocation; and allocating, by the processor, the candidates, upon determining that there is sufficient candidate resource available for allocation.

20 Claims, 4 Drawing Sheets

(56) References Cited

U.S. PATENT DOCUMENTS

| | | | | |
|---|---|---|---|---|
| 2019/0223164 | A1* | 7/2019 | He | H04W 76/27 |
| 2019/0297605 | A1* | 9/2019 | Kim | H04W 72/23 |
| 2019/0313321 | A1* | 10/2019 | Xu | H04W 72/51 |
| 2021/0051685 | A1* | 2/2021 | Hosseini | H04W 72/20 |
| 2022/0225284 | A1* | 7/2022 | Hakola | H04L 5/0053 |
| 2022/0303959 | A1* | 9/2022 | Khoshnevisan | H04L 1/0072 |
| 2022/0304026 | A1* | 9/2022 | MolavianJazi | H04L 1/0061 |
| 2022/0361005 | A1* | 11/2022 | Khoshnevisan | H04B 7/0408 |
| 2023/0096505 | A1* | 3/2023 | Khoshnevisan | H04W 74/006 370/329 |
| 2023/0156738 | A1* | 5/2023 | Gao | H04W 72/232 370/330 |
| 2023/0354070 | A1* | 11/2023 | Cirik | H04L 27/2602 |
| 2024/0178977 | A1* | 5/2024 | Zhang | H04L 5/0048 |
| 2024/0205959 | A1* | 6/2024 | Zhang | H04W 72/56 |
| 2024/0313924 | A1* | 9/2024 | Zhang | H04L 5/0053 |

FOREIGN PATENT DOCUMENTS

| | | | | |
|---|---|---|---|---|
| EP | 3815289 | B1 * | 10/2024 | H04W 72/0446 |
| WO | 2020033652 | A1 | 2/2020 | |
| WO | 2021048581 | A1 | 3/2021 | |

OTHER PUBLICATIONS 21932039.7 , "Extended European Search Report", EP Application No. 21932039.7, Nov. 4, 2024, 11 pages.

Ericsson , "On PDCCH, PUCCH and PUSCH enhancements with multiple TRPs", 3GPP TSG-RAN WG1 Meeting #103, R1-2009223, eMeeting, Oct. 2020, 25 pages.

* cited by examiner

METHODS AND APPARATUS OF ENHANCED CANDIDATE ALLOCATION SCHEMES FOR ENHANCED PDCCH

FIELD

The subject matter disclosed herein relates generally to wireless communication and more particularly relates to, but not limited to, methods and apparatus of candidate allocation schemes for enhanced Physical Downlink Control Channel (ePDCCH).

BACKGROUND

The following abbreviations and acronyms are herewith defined, at least some of which are referred to within the specification:

Third Generation Partnership Project (3GPP), 5th Generation (5G), New Radio (NR), 5G Node B/generalized Node B (gNB), Long Term Evolution (LTE), LTE Advanced (LTE-A), E-UTRAN Node B/Evolved Node B (eNB), Universal Mobile Telecommunications System (UMTS), Worldwide Interoperability for Microwave Access (WiMAX), Evolved UMTS Terrestrial Radio Access Network (E-UTRAN), Wireless Local Area Networking (WLAN), Orthogonal Frequency Division Multiplexing (OFDM), Single-Carrier Frequency-Division Multiple Access (SC-FDMA), Downlink (DL), Uplink (UL), User Entity/Equipment (UE), Network Equipment (NE), Radio Access Technology (RAT), Receive or Receiver (RX), Transmit or Transmitter (TX), Physical Downlink Control Channel (PDCCH), Bandwidth Part (BWP), Control Channel Element (CCE), Control Resource Set (CORESET), Common Search Space (CSS), Downlink Control Information (DCI), Frequency-Division Multiplexing (FDM), Frequency Division Multiple Access (FDMA), Identifier (ID), Primary Cell (PCell), Physical Resource Block (PRB), Subcarrier Spacing (SCS), Time-Division Multiplexing (TDM), Transmit Receive Point (TRP), UE-specific Search Space (USS), Frequency Range 1 (FR1), Frequency Range 2 (FR2), Technical Specification (TS), Primary Secondary Cell (PS-Cell), Log Likelihood Ratio (LLR).

In wireless communication, such as a Third Generation Partnership Project (3GPP) mobile network, a wireless mobile network may provide a seamless wireless communication service to a wireless communication terminal having mobility, i.e. user equipment (UE). The wireless mobile network may be formed of a plurality of base stations and a base station may perform wireless communication with the UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 GHz range (from 450 to 6000 MHz) is called FR1 and millimeter wave range (from 24.25 GHz to 52.6 GHz) is called FR2. The 5G NR supports both FR1 and FR2 frequency bands.

Enhancements on multi-TRP/panel transmission including improved reliability and robustness with both ideal and non-ideal backhaul between these TRPs (Transmit Receive Points) are studied. A TRP is an apparatus to transmit and receive signals, and is controlled by a gNB through the backhaul between the gNB and the TRP. A TRP may also be referred to as a transmitting-receiving identity, or simply an identity.

In current NR system, Physical Downlink Control Channel (PDCCH) is transmitted from a single TRP. With multiple TRPs, time-frequency resources for PDCCH transmission may be from multiple TRPs. The spatial diversity may be exploited in addition to the time-frequency diversity. Enhanced Physical Downlink Control Channel (ePDCCH) allows exploitation of the resources from multiple TRPs to improve PDCCH transmission reliability and robustness. Multiple transmissions of the ePDCCH may be transmitted from a same TRP or some different TRPs.

SUMMARY

Methods and apparatus of enhanced candidate allocation schemes for enhanced PDCCH are disclosed.

According to a first aspect, there is provided a method, including: receiving, by a receiver, configurations of a plurality of search space sets that are linked for a Physical Downlink Control Channel (PDCCH) transmission with a plurality of repetitions; wherein the plurality of repetitions of the PDCCH are transmitted on a plurality of candidates; determining, by a processor, according to a priority rule with a predefined granularity, by counting the candidates from the linked search space sets, whether there is sufficient candidate resource available for allocation; and allocating, by the processor, the candidates, upon determining that there is sufficient candidate resource available for allocation.

According to a second aspect, there is provided a method, including: transmitting, by a transmitter, configurations of a plurality of search space sets that are linked for a Physical Downlink Control Channel (PDCCH) transmission with a plurality of repetitions; wherein the plurality of repetitions of the PDCCH are to be transmitted on a plurality of candidates; determining, by a processor, according to a priority rule with a predefined granularity, by counting the candidates from the linked search space sets, whether there is sufficient candidate resource available for allocation; allocating, by the processor, the candidates, upon determining that there is sufficient candidate resource available for allocation; and transmitting, by the transmitter, the plurality of repetitions of the PDCCH on the plurality of candidates.

According to a third aspect, there is provided an apparatus, including: a receiver that receives configurations of a plurality of search space sets that are linked for a Physical Downlink Control Channel (PDCCH) transmission with a plurality of repetitions; wherein the plurality of repetitions of the PDCCH are transmitted on a plurality of candidates; and a processor that determines, according to a priority rule with a predefined granularity, by counting the candidates from the linked search space sets, whether there is sufficient candidate resource available for allocation; wherein the processor allocates the candidates, upon determining that there is sufficient candidate resource available for allocation.

According to a fourth aspect, there is provided an apparatus, including: a transmitter that transmits configurations of a plurality of search space sets that are linked for a Physical Downlink Control Channel (PDCCH) transmission with a plurality of repetitions; wherein the plurality of repetitions of the PDCCH are to be transmitted on a plurality of candidates; and a processor that determines, according to a priority rule with a predefined granularity, by counting the candidates from the linked search space sets, whether there is sufficient candidate resource available for allocation; wherein the processor allocates the candidates, upon determining that there is sufficient candidate resource available for allocation; and wherein the transmitter transmits the plurality of repetitions of the PDCCH on the plurality of candidates.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which.

DETAILED DESCRIPTION

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

Furthermore, one or more embodiments may take the form of a program product embodied in one or more computer readable storage devices storing machine readable code, computer readable code, and/or program code, referred to hereafter as "code." The storage devices may be tangible, non-transitory, and/or non-transmission.

Reference throughout this specification to "one embodiment," "an embodiment," "an example," "some embodiments," "some examples," or similar language means that a particular feature, structure, or characteristic described is included in at least one embodiment or example. Thus, instances of the phrases "in one embodiment," "in an example," "in some embodiments," and similar language throughout this specification may, but do not necessarily, all refer to the same embodiment(s). It may or may not include all the embodiments disclosed. Features, structures, elements, or characteristics described in connection with one or some embodiments are also applicable to other embodiments, unless expressly specified otherwise. The terms "including," "comprising," "having," and variations thereof mean "including but not limited to," unless expressly specified otherwise.

An enumerated listing of items does not imply that any or all of the items are mutually exclusive, unless expressly specified otherwise. The terms "a," "an," and "the" also refer to "one or more" unless expressly specified otherwise.

Throughout the disclosure, the terms "first," "second," "third," and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a "second step."

It should be understood that the term "and/or" as used herein refers to and includes any and all possible combinations of one or more of the associated listed items. For example, "A and/or B" may refer to any one of the following three combinations: existence of A only, existence of B only, and co-existence of both A and B. The character "/" generally indicates an "or" relationship of the associated items. This, however, may also include an "and" relationship of the associated items. For example, "A/B" means "A or B," which may also include the co-existence of both A and B, unless the context indicates otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, may be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions or acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function or act specified in the schematic flowchart diagrams and/or schematic block diagrams.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved.

Figure 1:
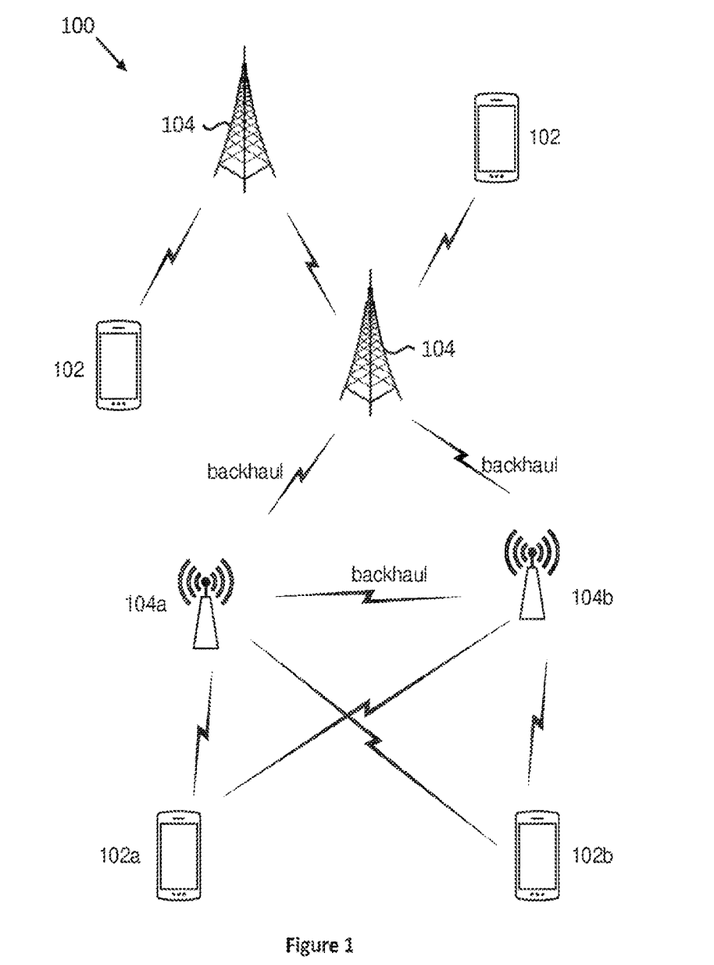
FIG. 1 is a schematic diagram illustrating a wireless communication system in accordance with some implementations of the present disclosure.

FIG. 1 is a schematic diagram illustrating a wireless communication system. It depicts an embodiment of a wireless communication system 100. In one embodiment, the wireless communication system 100 may include a user equipment (UE) 102 and a network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the DL and the UEs 102 transmit on the uplink (UL) using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

Communication links are provided between the NE 104 and the UEs 102*a*, 102*b*, 102*c*, and 102*d*, which may be NR UL or DL communication links, for example. Some UEs 102 may simultaneously communicate with different Radio Access Technologies (RATs), such as NR and LTE. Direct or indirect communication link between two or more NEs 104 may be provided.

The NE 104 may also include one or more transmit receive points (TRPs) 104*a*. In some embodiments, the network equipment may be a gNB 104 that controls a number of TRPs 104*a*. In addition, there is a backhaul between two TRPs 104*a*. In some other embodiments, the network equipment may be a TRP 104*a* that is controlled by a gNB.

Communication links are provided between the NEs 104, 104*a* and the UEs 102, 102*a*, respectively, which, for example, may be NR UL/DL communication links. Some UEs 102, 102*a* may simultaneously communicate with different Radio Access Technologies (RATs), such as NR and LTE.

In some embodiments, the UE 102*a* may be able to communicate with two or more TRPs 104*a* that utilize a non-ideal backhaul, simultaneously. A TRP may be a transmission point of a gNB. Multiple beams may be used by the UE and/or TRP(s). The two or more TRPs may be TRPs of different gNBs, or a same gNB. That is, different TRPs may have the same Cell-ID or different Cell-IDs. The terms "TRP" and "transmitting-receiving identity" may be used interchangeably throughout the disclosure.

The technology disclosed, or at least some of the examples, may be applicable to scenarios with multiple TRPs or without multiple TRPs, as long as multiple PDCCH transmissions are supported.

Figure 2:
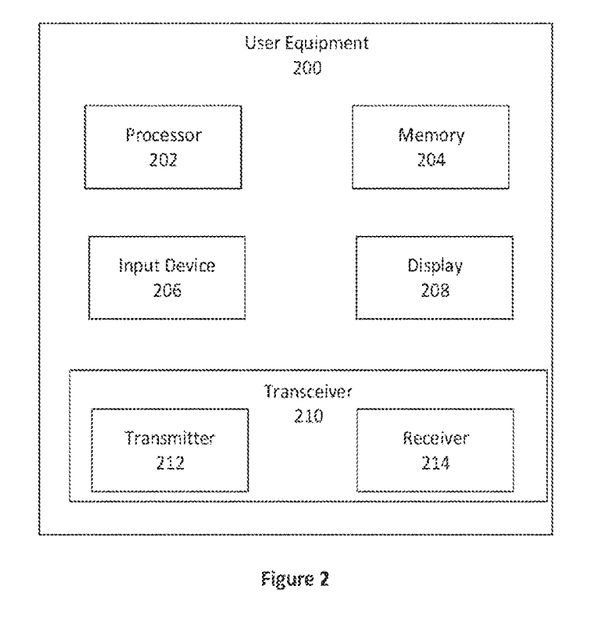
FIG. 2 is a schematic block diagram illustrating components of user equipment (UE) in accordance with some implementations of the present disclosure.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display.

The display 208, in one embodiment, may include any known electronically controllable display or display device. The display 208 may be designed to output visual, audio, and/or haptic signals.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
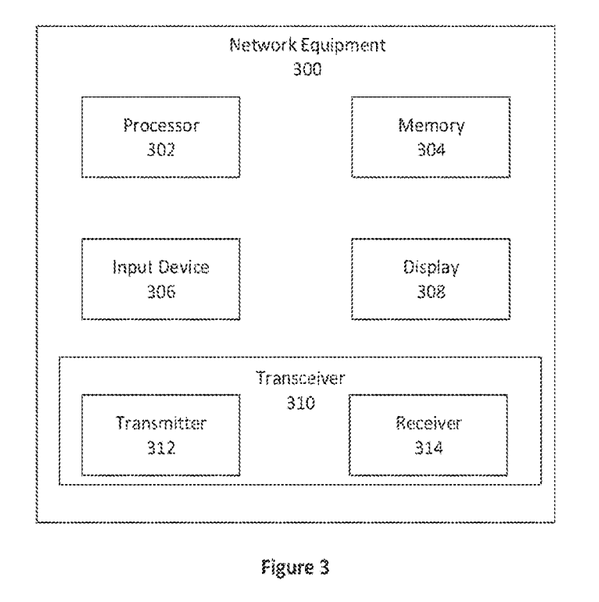
FIG. 3 is a schematic block diagram illustrating components of network equipment (NE) in accordance with some implementations of the present disclosure.

FIG. 3 is a schematic block diagram illustrating components of network equipment (NE) 300 according to one embodiment. The NE 300 may include a processor 302, a memory 304, an input device 306, a display 308, and a transceiver 310. As may be appreciated, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals or data to the UE 200. The processor 302 may also control the transceiver 310 to receive UL signals or data from the UE 200. In another example, the processor 302 may control the transceiver 310 to transmit DL signals containing various configuration data to the UE 200.

In some embodiments, the transceiver 310 comprises a transmitter 312 and a receiver 314. The transmitter 312 is used to transmit DL communication signals to the UE 200 and the receiver 314 is used to receive UL communication signals from the UE 200.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, where the transceiver 310 includes a transmitter 312 and a receiver 314 for each cell or cell sector.

Each UE has a PDCCH monitoring capability in terms of maximum number of PDCCH candidates per slot/span and maximum number of channel estimations per slot/span. The PDCCH candidates are then mapped to search space sets when both numbers of candidates and CCEs for channel estimation are within the maximum numbers defined by the PDCCH monitoring capability. gNB can slightly overbook the PDCCH monitoring capability in some monitoring occasions, in order to fully utilize the UE monitoring capability in all occasions.

In the current 3GPP specification, PDCCH overbook technique is only used for PCell and PScell, and USS level candidate allocation and dropping scheme are defined. A priority rule is defined for candidate allocation, where CSS has a higher priority than USS, and USS with a lower search space set ID has a relatively higher priority. When there is not enough resource for all the candidates of one search space set, the candidates of this search space set and later search space set with a larger search space set ID will be dropped.

PDCCH overbooking scheme is specified in TS 38.213, where PDCCH candidate allocation scheme on search space set level is defined, and the candidates from USS with a lower ID has a higher priority for candidate allocation. The detailed information is as follows.

The UE allocates PDCCH candidates for monitoring to USS sets for the primary cell having an active DL BWP with SCS configuration μ in a slot if the UE is not provided PDCCHMonitoringCapabilityConfig for the primary cell or if the UE is provided PDCCHMonitoringCapabilityConfig = r15monitoringcapability for the primary cell, or in the first span of each slot if the UE is provided PDCCHMonitoringCapabilityConfig = r16monitoringcapability for -continued the primary cell, according to the following pseudocode. If for the USS sets for scheduling on the primary cell the UE is not provided CORESETPoolIndex for first CORESETs, or is provided CORESETPoolIndex with value 0 for first CORESETs, and is provided CORESETPoolIndex with value 1 for second CORSETs, and if $\min(\gamma \cdot M_{PDCCH}^{max,slot,\mu}, M_{PDCCH}^{total,slot,\mu}) > \min(M_{PDCCH}^{max,slot,\mu}, M_{PDCCH}^{total,slot,\mu})$ or $\min(\gamma \cdot$ $C_{PDCCH}^{max,slot,\mu}, C_{PDCCH}^{total,slot,\mu}) > \min(C_{PDCCH}^{max,slot,\mu}, C_{PDCCH}^{total,slot,\mu})$, the following peseudocode applies only to USS sets associated with the first CORESETs. A UE does not expect to monitor PDCCH in a USS set without allocated PDCCH candidates for monitoring. In the following pseudocode, if the UE is provided $PDCCHMonitoringCapabilityConfig = r16monitoringcapability$ for the primary cell, $M_{PDCCH}^{max,slot,\mu}$ and $C_{PDCCH}^{max,slot,\mu}$ are replaced by $M_{PDCCH}^{max(X,Y),\mu}$ and $C_{PDCCH}^{max(X,Y),\mu}$ respectively, and $M_{PDCCH}^{total,slot,\mu}$ and $C_{PDCCH}^{total,slot,\mu}$ are replaced by $M_{PDCCH}^{max(X,Y),\mu}$ and $C_{PDCCH}^{max(X,Y),\mu}$ respecively.

Denote by $V_{CCE}(S_{uss}(j))$ the set of non-overlapping CCEs for search space set $S_{uss}(j)$ and by $\mathcal{C}(V_{CCE}(S_{uss}(j)))$ the cardinality of $V_{CCE}(S_{uss}(j))$ where the non-overlapping CCEs for search space set $S_{uss}(j)$ are determined considering the allocated PDCCH candidates for monitoring for the CSS sets and the allocated PDCCH candidates for monitoring for all search space sets $S_{uss}(k)$, $0 \le k \le j$.

Set $M_{PDCCH}^{uss} = \min(M_{PDCCH}^{max,slot,\mu}, M_{PDCCH}^{total,slot,\mu}) - M_{PDCCH}^{css}$ Set $C_{PDCCH}^{nss} = \min(C_{PDCCH}^{max,slot,\mu}, C_{PDCCH}^{total,slot,\mu}) - C_{PDCCH}^{css}$ Set j = 0 while $\sum_L M_{S_{uss}(j)}^{(L)} \le M_{PDCCH}^{uss}$ AND $C(V_{CCE}(S_{uss}(j))) \le C_{PDCCH}^{uss}$ allocate $\sum_L M_{S_{uss}(j)}^{(L)}$ PDCCH candidates for monitoring to USS set $S_{uss}(j)$ $M_{PDCCH}^{uss} = M_{PDCCH}^{uss} - \sum_L M_{S_{uss}(j)}^{(L)}$;

$C_{PDCCH}^{uss} = C_{PDCCH}^{uss} - \mathcal{C}(V_{CCE}(S_{uss}(j)))$;

j = j + 1;
end while

For ePDCCH (enhanced PDCCH) transmission, one DCI may be transmitted with multiple candidates with repetitions from multiple TRPs to improve reliability, i.e., multiple candidates with multiple repeat transmissions may be used for enhanced PDCCH transmission.

For ePDCCH, two linked search space sets are configured for monitoring multiple PDCCH with repeat transmission, and two candidates from the linked search space sets are used together for one PDCCH detection. In this disclosure, the enhanced candidate allocation schemes for enhanced PDCCH, including dropping schemes and counting schemes, are proposed based on two linked search space sets and/or two linked candidates.

Figure 4:
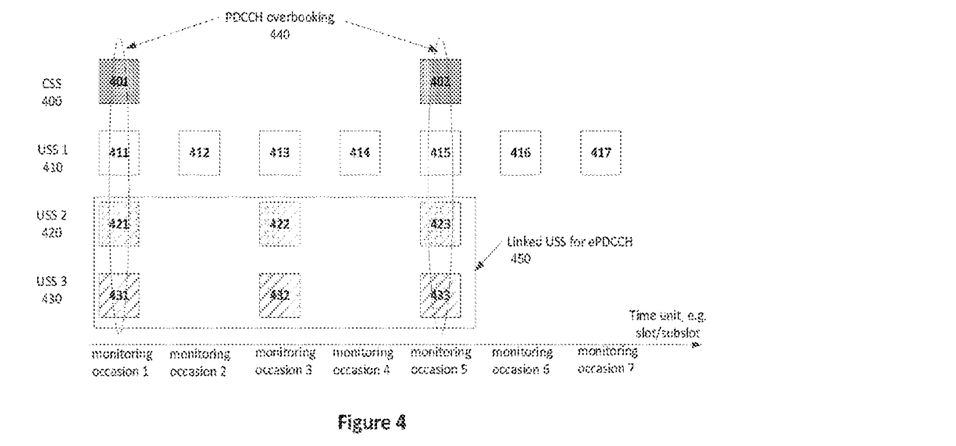
FIG. 4 is a schematic diagram illustrating an example of an application of ePDCCH candidate allocation schemes in accordance with some implementations of the present disclosure.

FIG. 4 is a schematic diagram illustrating an example of an application of ePDCCH candidate allocation schemes in accordance with some implementations of the present disclosure. As shown in FIG. 4, multiple search space sets are configured for PDCCH candidate monitoring, including CSS 400, USS 1 410 for normal PDCCH, and linked search space set 450 which includes USS 2 420 and USS 3 430 for ePDCCH. Each of the squares 401-402, 411-417, 421-423 and 431-433 represents one PDCCH monitoring occasion. PDCCH overbooking 440 is made on monitoring occasions 1 and 5 on account of larger number of monitoring candidates from multiple search space sets. In this disclosure, candidate allocation schemes are proposed for candidates from linked search space sets, such as the linked USS 450, or USS 2 420 and USS 3 430, as shown in FIG. 4.

For normal PDCCH, candidates are defined independently for each search space set. Candidate allocation is made with granularity of one search space set. For ePDCCH, multiple linked search space sets are configured, from which multiple linked candidates with one-one mapping are used for one DCI detection to improve reliability. The linkage between search space sets and/or candidates are utilized in the candidate allocation schemes. Candidate allocation may be made based on two search space sets jointly or individually, which includes candidate counting schemes and candidate dropping schemes.

Candidate Allocation Schemes Based on Two Linked Search Space Sets Jointly

In these schemes, candidate allocation is made for two search space sets linked together. PDCCH candidates in the two linked search space sets are counted together to find whether there are sufficient available resources for PDCCH candidate allocation. In the example shown in FIG. 4, the candidate numbers from USS 2 420 and USS 3 430 are counted together and the counted number is then compared with the available candidate number up to now. If the number of counted candidates is not larger than the available candidate number, all the candidates are monitored for PDCCH decoding. If the number of counted candidates is larger than the available candidate number, some candidates will be dropped based on the dropping scheme. The candidates may be dropped with granularity of the linked search space sets.

The pseudocode of an example of the candidate allocation scheme is shown below, where PDCCH candidate allocation is made based on linked search space set j and k. In the candidate allocation schemes, PDCCH candidate counting and resource mapping/dropping are made for two linked search space sets together, or jointly.

```
while Σ_L M_{S_uss(j)}^{(L)} + Σ_L M_{S_uss(k)}^{(L)} ≤ M_{PDCCH}^{USS} AND C(V_{CCE}(S_{USS}(j))) + C(V_{CCE}(S_{USS}(k))) ≤ C_{PDCCH}^{USS}
    allocate Σ_L M_{S_uss(j)}^{(L)} + Σ_L M_{S_uss(k)}^{(L)} PDCCH candidates for monitoring to USS set S_{USS}(j) and USS set
        S_{USS}(k)
    M_{PDCCH}^{USS} = M_{PDCCH}^{USS} − (Σ_L M_{S_uss(j)}^{(L)} + Σ_L M_{S_uss(k)}^{(L)});
    C_{PDCCH}^{USS} = C_{PDCCH}^{USS} − (C(V_{CCE}(S_{USS}(j))) + C(V_{CCE}(S_{USS}(k))));
    j = j + 1 ;
end while
```

Candidate Counting Schemes

Various PDCCH candidate counting schemes may be used to determine $\Sigma_L M_{S_{uss}(j)}^{(L)} + \Sigma_L M_{S_{uss}(k)}^{(L)}$ (or number of counted candidates). Here, different decoding schemes need to be considered for candidate counting since two paired candidates are detected together for one DCI. Different counting schemes may be used on account of diverse overbooking strategies and UE decoding behaviours. For PDCCH candidate allocation, the candidate number for linked PDCCH candidate pairs may be determined according to the following schemes.

Scheme 1: the candidate number may be determined based on gNB configured value, i.e., a value configured by gNB. The configured value may be determined based on PDCCH loading and UE reported counting number if existed. This is efficient for overbooking by considering PDCCH loading. However, it may have implicit restriction on UE decoding scheme for good matching resource allocation scheme based on gNB's decision.

Scheme 2: the candidate number may be a fixed value. For example, it may be defined as 2 with the assumption of medium decoding complexity, or defined as 3 with the assumption of maximum decoding complexity. This counting scheme may be the simplest. However, the PDCCH candidate allocation scheme may not be optimized based on PDCCH load and UE actual decoding scheme. The resource usage efficiency may be low in the case of larger fixed value, and PDCCH performance or resource allocation flexibility may be low in the case of smaller fixed value.

Scheme 3: the candidate number may be determined based on a UE reported value. It may be well matched with the decoding algorithm. However, it has no optimization based on PDCCH load since the counting scheme is determined by UE.

That is, while each having different merits and drawbacks, a configured value, fixed value or UE reported value may be used for joint PDCCH candidate counting for two linked search space sets.

Candidate Dropping Schemes

Various dropping schemes may be used when the counted candidate number is larger than the available candidate number up to now. In one type of dropping schemes, a priority rule may be defined for both linked search space sets. Specifically, a same priority rule defined in current specification may be reused such that candidates for USS with a smaller search space set ID may be assigned a high priority. All the candidates from both linked search space sets are allocated resources or dropped together.

Since there are two linked search space sets for enhanced PDCCH, it is required to specify which search space set (also referred to as the reference search space) is used to compare with normal PDCCH search space set for determination of the priority.

In one example, the search space set with a relatively smaller ID in the two linked search space sets may be used as the reference search space set. This is based on the principle that a relatively high priority is set for ePDCCH candidate allocation.

In another example, the search space set corresponding to the first PDCCH transmission may be used as the reference search space set for overbooking. The first PDCCH transmission may be the candidate with an earlier monitoring occasion for TDM based scheme, or smaller starting Physical Resource Block (PRB) number of CORESET for FDM based scheme. This is based on the principle of first come, first served. Thus, the reference space set may be the USS for monitoring the first PDCCH transmission. The reference search space set may be one of the linked search space sets corresponding to a smaller starting PRB number of CORESET. In some other examples, the reference search space set may be one of the linked search space sets with a smaller PRB starting number for the candidates.

The search space set with a smaller ID may be assigned with a high priority for resource allocation, where the ID of the reference search space set is used to determine candidate allocation priority for two linked search space sets. The search space set with a smaller ID or the search space set for monitoring the first PDCCH transmission may serve as the reference search space set.

In another type of dropping schemes, a priority rule may be defined based on candidate pair level or candidate set level. For candidate pair level dropping scheme, a PDCCH candidate pair is allocated with resources according to its order in the concatenated candidate set. That is, upon determining that there is insufficient candidate resource available for allocation, the candidates are dropped with granularity of linked candidate pair. When there is not enough candidate resource, the current and later candidate pairs are dropped.

Figure 5A:
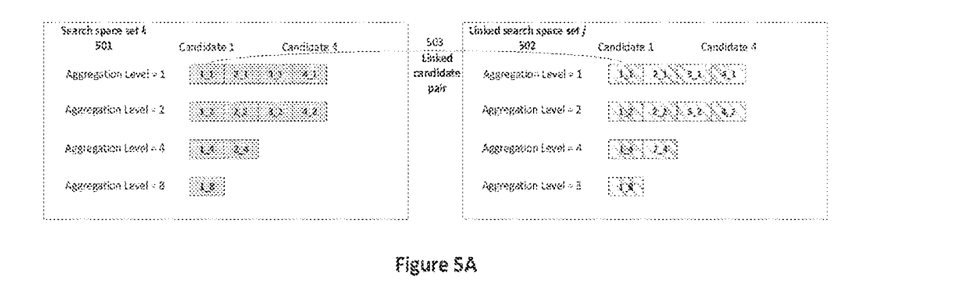
FIG. 5A is a schematic diagram illustrating an example of candidates of two linked search space sets with aggregation levels 1, 2, 4 and 8 in accordance with some implementations of the present disclosure.

FIG. 5A is a schematic diagram illustrating an example of candidates of two linked search space sets with aggregation levels 1, 2, 4 and 8 in accordance with some implementations of the present disclosure. In each of the search space set k 501 and the linked search space set j 502, four candidates 1_1, 2_1, 3_1, 4_1 for aggregation level 1, four candidates 1_2, 2_2, 3_2, 4_2 for aggregation level 2, two candidates 1_4, 2_4, for aggregation level 4, and one candidate 1_8, for aggregation level 8, are shown in the Figure. The numbering of each candidate indicates the order and aggregation level of the candidate. For example, candidate 1_8 refers to the first candidate of aggregation level 8. The candidates in search space set k 501 and search space set j 502 may be linked together. For example, candidate 1_1 from the search space set k is linked with candidate 1_1 from the search space set j, forming a linked candidate pair 503.

Figure 5B:
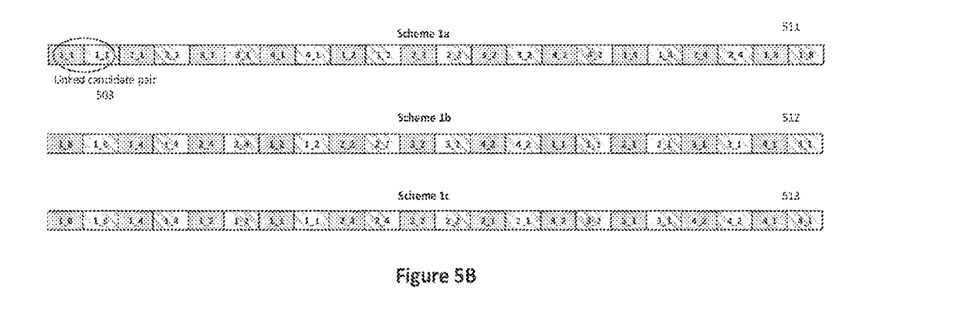
FIG. 5B is a schematic diagram illustrating examples of candidate pair level dropping schemes based on concatenated candidate sets for the two linked search space sets shown in FIG. 5A in accordance with some implementations of the present disclosure.

FIG. 5B is a schematic diagram illustrating examples of candidate pair level dropping schemes based on concatenated candidate sets for the two linked search space sets shown in FIG. 5A. This includes three detailed concatenation schemes, 511, 512 and 513.

For the concatenated candidate set, the candidates may be concatenated at first level on candidate pairs for each aggregation level and second level on aggregation level, where the aggregation level may be sorted with the natural order, i.e. from low aggregation level to high aggregation level, or with the reserve order, i.e. from high aggregation level to low aggregation level.

In scheme 511 (scheme 1a), candidate pairs are concatenated with first level on candidate pairs in one aggregation level and second level on aggregation level. That is, for example, in the order of candidate 1_1 from search space set k 501, candidate 1_1 from search space set j 502, candidate 2_1 from search space set k, candidate 2_1 from search space set j and so on. Here, candidate 1_1 (2_1 . . . ) from search space set k and candidate 1_1 (2_1 . . . ) from search space set j form a linked candidate pair.

In scheme 512 (scheme 1b), candidate pairs are concatenated with first level on candidate pairs in one aggregation level and second level on aggregation level with the reverse order. That is, for example, in the order of candidate 1_8 from search space set k, candidate 1_8 from search space set j, candidate 1_4 from search space set k, candidate 1_4 from search space set j, candidate 2_4 from search space set k, candidate 2_4 from search space set j and so on. In this scheme, higher priority is used for high aggregation level.

In scheme 513 (scheme 1c), candidate pairs are concatenated with first level on aggregation level with the reverse order and second level on candidate pairs in one aggregation level. That is, for example, in the order of candidate 1_8 from search space set k, candidate 1_8 from search space set j, candidate 1_4 from search space set k, candidate 1_4 from search space set j, candidate 1_2 from search space set k, candidate 1_2 from search space set j and so on. In this scheme, higher priority is used for candidate set with all the aggregation levels These enhanced dropping schemes are made on candidate pair level, where PDCCH candidate pairs are allocated resource according to their order in the concatenated candidate set.

Dropping schemes on candidate pair level have finer granularity but with larger specification effort for defining mapping order based on concatenation candidate set.

Dropping scheme based on candidate set may be used as a trade-off scheme, where the candidates are dropped with granularity based on the candidate sets. For candidates from two linked search space sets for enhanced PDCCH, they are divided into candidate set 1 and 2. Candidate set 1 includes the union of the first half of candidates in each aggregation level of two linked search space sets; and candidate set 2 includes the remaining candidates of two linked search space sets. When there are not enough candidate resources for all candidates from one candidate set, all the candidates in this and later candidate set will be dropped. In this scheme, it guarantees the transmission reliability with candidates from both search space sets and scheduling flexibility with candidates from all aggregation levels. It also needs relatively low specification effort since it is simple to divide candidates into two candidate sets.

Figure 5C:
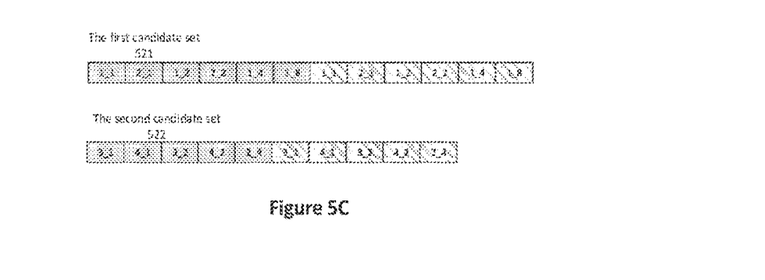
FIG. 5C is a schematic diagram illustrating examples of candidate set level dropping scheme based on candidate sets for the two linked search space sets shown in FIG. 5A in accordance with some implementations of the present disclosure.

FIG. 5C is a schematic diagram illustrating examples of candidate set level dropping scheme based on candidate sets for the two linked search space sets shown in FIG. 5A in accordance with some implementations of the present disclosure. As shown in FIG. 5C, the first candidate set 521 includes the first half of candidates in each aggregation level, i.e. the first and second candidates (candidates 1_1, and 2_1) of aggregation level 1, the first and second candidates of aggregation level 2 (candidates 1_2, and 2_2), the first candidate of aggregation level 4 (candidate 1_4), and the first candidate of aggregation level 8 (candidate 1_8), in two search space sets. The remaining candidates are included in the second candidate set 522 as shown in FIG. 5C. Then, dropping may be further made based on newly defined candidate sets if there are not enough candidate resources.

That is, enhanced dropping schemes may be made on candidate set level for two linked search space sets, where the two new candidate sets include the first candidate set including a first half of the candidates from each aggregation level of each linked search space set; and the second candidate set including a second half of the candidates from each aggregation level of each linked search space set.

Fallback Candidate Counting Scheme for Reducing Candidate Dropping

When candidate dropping is made based on two linked search space sets, the resource granularity for dropping is increased relative to the dropping scheme based on one search space set defined in the current 3GPP specification. Especially, when a large number, e.g. 3, is used as a counting candidate number for linked candidate pair, the resource usage efficiency will be decreased since the resources are not enough for containing all candidates of two linked search space sets and thus cannot be used for PDCCH resource allocation. To reduce the dropping probability and improve resource usage efficiency, the counting scheme with a smaller counting value for linked candidate pair may be used as a fallback candidate counting scheme. When there is not enough resource for all the candidates of linked search space sets, UE may further check whether there is enough resource based on fallback counting scheme. If there is enough resource, resource allocation may be made based on fallback counting scheme instead of dropping candidates. If there is still not enough resource based on the fallback counting scheme, UE will not allocate PDCCH resource and drop PDCCH candidates. For example, a candidate counting number with a value between 1 and 2 may be used in the fallback counting scheme when one time of blind detection is assumed to be used for two linked candidates with LLR combination. With fallback candidate counting scheme, it provides good trade-off between resource usage efficiency and enhanced PDCCH detection performance. To provide some flexibility, the fallback counting scheme used for further checking candidate dropping may be optionally configured by gNB That is, two counting schemes may be provided, including: a first counting scheme for performing an initial counting of the candidates for resource allocation; and a second counting scheme for counting the candidates upon determining that, based on the first counting scheme, there is insufficient candidate resource available for allocation. The second counting scheme may be the fallback counting scheme, and the first counting scheme may be any one of the other counting schemes disclosed above. UE may allocate candidate resource if there is enough candidate resource based on the fallback counting scheme when candidate dropping is required based on normal counting scheme.

Candidate Allocation Schemes Based on Individual Search Space Sets

In the schemes, candidate allocation is made based on individual search space sets, independently. It reuses the principle of candidate allocation defined in the current 3GPP specification. For candidate counting scheme, individual candidate counting numbers are determined for the candidates of each of linked search space sets, which is closely related with decoding behaviours.

For decoding behaviour 1, UE only decodes the combined candidate without decoding individual PDCCH candidates from the two linked search space sets together. In the corresponding two search space sets, the counted candidate number for the first candidate of linked candidate pair in one search space set is 0 and the counted candidate number for the second candidate of linked candidate pair in another search space set is a value between 1 and 2 on account of additional complexity for LLR storing and combination.

For decoding behaviour 2, UE decodes individual PDCCH candidates. In the corresponding two search space sets, the counted candidate number for the first candidate of linked candidate pair in one search space set is 1 and the counted candidate number for the second candidate of linked candidate pair in another search space set is also 1.

For decoding behaviour 3, UE decodes the first PDCCH candidate and the combined candidate. In the corresponding two search space sets, the counted candidate number for the first candidate of linked candidate pair in one search space set is 1 and the counted candidate number for the second candidate of linked candidate pair in another search space set is a value between 1 and 2 on account of additional complexity for LLR storing and combination.

For decoding behaviour 4, UE decodes each PDCCH candidate individually and also decodes the combined candidate. In the corresponding two search space sets, the counted candidate number for the first candidate of linked candidate pair in one search space set is 1 and the counted candidate number for the second candidate of linked candidate pair in another search space set is a value between 2 and 3 on account of a value of 1 for independent second candidate from another search space and a value between 1 and 2 for the combined candidate with additional complexity for LLR storing and combination For the counting scheme with accurate candidate number for the corresponding decoding scheme, the UE reported value may be used as the counting number. In addition to this counting scheme, two configured or fixed values may be used as counting numbers for counting the first candidates and second candidates for linked candidates, respectively. As an example of the configured values, a value of 0 or 1 may be configured as the counting number for the first candidate and a value of 1 or a value 1 between 2 may be configured as the counting number for the second candidate. As an example of the fixed values, a value of 1 may serve as the counting number for the first candidate and a value between 1 and 2 may serve as the counting number for the second candidate That is, two configured values, fixed values or UE reported values may be used as candidate counting values for two linked candidates in the linked search space sets, respectively Candidate dropping may be made on search space set level with a high priority for search space set with a smaller index, which is similar as dropping schemes defined in the current 3GPP specification. UE will not allocate PDCCH candidates for the current and later search space sets when the counted candidate number for the current search space set is larger than the available candidate number up to now. The configuration of search space set index may be set with caution since it links with the candidate allocation priority. For blind detection with soft combining for candidate pair, UE will firstly make demodulation and LLR computation, and decode the first candidate; and secondly make demodulation and LLR computation, and decode the combined candidate. Thus, it will not be reasonable to allocate resources with higher priority for the search space set corresponding to the second candidate.

From this view, between two linked search space sets, UE is not expected that the search space set corresponding to the first candidate of linked candidates is configured with a larger search space set ID. That is, UE is not expected that, in two linked search space sets, a relatively larger search space set ID is configured for one of the search space sets for monitoring a candidate with an earlier monitoring occasion.

Furthermore, for optimization, UE is expected that linked search space sets may be configured with successive search space set IDs. With the configuration of successive search space set IDs, the second candidate may be made with high priority for candidate allocation relative to candidates from other search space sets without resource allocation. This may avoid that the resources are allocated to candidates of other search space sets and there is not enough resource for allocating candidates from the search space set corresponding to the second linked candidate. Thus, it may guarantee ePDCCH performance to a certain extent.

Figure 6:
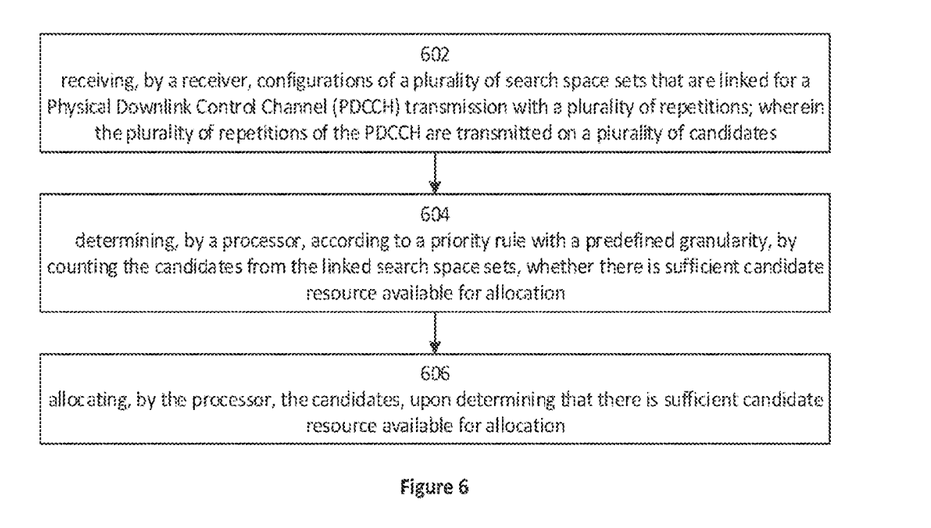
FIG. 6 is a flow chart illustrating steps of enhanced candidate allocation schemes for enhanced PDCCH by UE in accordance with some implementations of the present disclosure.

FIG. 6 is a flow chart illustrating steps of enhanced candidate allocation schemes for enhanced PDCCH by UE 200 in accordance with some implementations of the present disclosure.

At step 602, the receiver 214 of UE 200 receives configurations of a plurality of search space sets that are linked for a Physical Downlink Control Channel (PDCCH) transmission with a plurality of repetitions; wherein the plurality of repetitions of the PDCCH are transmitted on a plurality of candidates.

At step 604, the processor 202 of UE 200 determines according to a priority rule with a predefined granularity, by counting the candidates from the linked search space sets, whether there is sufficient candidate resource available for allocation.

At step 606, the processor 202 of UE allocates the candidates, upon determining that there is sufficient candidate resource available for allocation.

Figure 7:
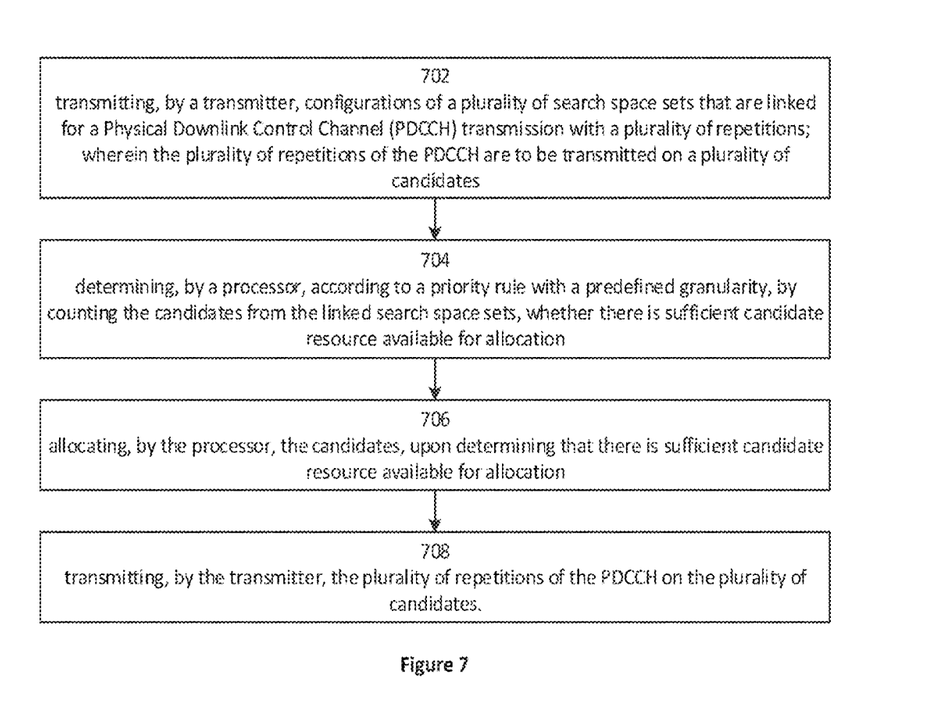
FIG. 7 is a flow chart illustrating steps of enhanced candidate allocation schemes for enhanced PDCCH by gNB or NE in accordance with some implementations of the present disclosure.

FIG. 7 is a flow chart illustrating steps of enhanced candidate allocation schemes for enhanced PDCCH by gNB or NE 300 in accordance with some implementations of the present disclosure.

At step 702, the transmitter 312 of NE 300 transmits configurations of a plurality of search space sets that are linked for a Physical Downlink Control Channel (PDCCH) transmission with a plurality of repetitions; wherein the plurality of repetitions of the PDCCH are to be transmitted on a plurality of candidates.

At step 704, the processor 302 determines according to a priority rule with a predefined granularity, by counting the candidates from the linked search space sets, whether there is sufficient candidate resource available for allocation.

At step 706, processor 302 allocates the candidates, upon determining that there is sufficient candidate resource available for allocation.

At step 708, the transmitter 312 of NE 300 transmits the plurality of repetitions of the PDCCH on the plurality of candidates.

In one aspect, some items as examples of the disclosure concerning a method of a UE or remote device may be summarized as follows:

1. A method, comprising:
   receiving, by a receiver, configurations of a plurality of search space sets that are linked for a Physical Downlink Control Channel (PDCCH) transmission with a plurality of repetitions; wherein the plurality of repetitions of the PDCCH are transmitted on a plurality of candidates;
   determining, by a processor, according to a priority rule with a predefined granularity, by counting the candidates from the linked search space sets, whether there is sufficient candidate resource available for allocation; and
   allocating, by the processor, the candidates, upon determining that there is sufficient candidate resource available for allocation.

2. The method of item 1, wherein, upon determining that there is insufficient candidate resource available for allocation, the candidates are dropped with granularity of the linked search space sets.

3. The method of item 1, wherein the priority rule comprises determining one of the linked search space sets as a reference search space set, and wherein a priority of the linked search space sets is determined based on an ID of the reference search space set.

4. The method of item 3, wherein a smaller ID of a search space set represents a higher priority.

5. The method of item 3, wherein the reference search space set is one of the linked search space sets with a smaller ID.

6. The method of item 3, wherein the reference search space set is:
   one of the linked search space sets for monitoring a candidate with an earlier monitoring occasion; or
   one of the linked search space sets corresponding to a smaller starting Physical Resource Block (PRB) number of Control Resource Set (CORESET).

7. The method of item 1, wherein the plurality of candidates are linked as candidate pairs, and upon determining that there is insufficient candidate resource available for allocation, the candidates are dropped with granularity of linked candidate pair.

8. The method of item 7, wherein the candidate pairs are allocated according to their order in a concatenated candidate set according to one of the concatenation schemes comprising:
   scheme A, at first level on candidate pair in one aggregation, and second level on aggregation level;
   scheme B, at first level on candidate pair in one aggregation, and second level on aggregation level in reverse order; and
   scheme C, at first level on aggregation level in reverse order, and second level on candidate pair in one aggregation.

9. The method of item 1, wherein the plurality of candidates are grouped into a plurality of candidate sets; and upon determining that there is insufficient candidate resource available for allocation, the candidates are dropped with granularity based on the candidate sets.

10. The method of item 9, wherein the plurality of candidate sets comprises: a first candidate set comprising a first half of the candidates from each aggregation level of each linked search space set; and a second candidate set comprising a second half of the candidates from each aggregation level of each linked search space set.

11. The method of item 1, wherein the candidates from the linked search space sets are counted jointly.

12. The method of item 11, wherein two counting schemes are provided, including:
   a first counting scheme for performing an initial counting of the candidates for resource allocation; and
   a second counting scheme for counting the candidates upon determining that, based on the first counting scheme, there is insufficient candidate resource available for allocation.

13. The method of item 11, wherein a configured value, fixed value or UE reported value is used as a counting number for a pair of candidates that are linked for joint counting.

14. The method of item 13, wherein a value that is smaller than the counting number is used as a fallback counting number for a pair of candidates that are linked for joint counting.

15. The method of item 1, wherein it is not expected that, in two linked search space sets, a relatively larger search space set ID is configured for one of the search space sets for monitoring a candidate with an earlier monitoring occasion.

16. The method of item 1, wherein it is expected that two linked search space sets are configured with successive search space set IDs.

17. The method of item 1, wherein a configured value, fixed value or UE reported value is used as a counting number for a candidate of each search space set.

In another aspect, some items as examples of the disclosure concerning a method of a NE or gNB may be summarized as follows:

18. A method, comprising:
   transmitting, by a transmitter, configurations of a plurality of search space sets that are linked for a Physical Downlink Control Channel (PDCCH) transmission with a plurality of repetitions; wherein the plurality of repetitions of the PDCCH are to be transmitted on a plurality of candidates;
   determining, by a processor, according to a priority rule with a predefined granularity, by counting the candidates from the linked search space sets, whether there is sufficient candidate resource available for allocation;
   allocating, by the processor, the candidates, upon determining that there is sufficient candidate resource available for allocation; and
   transmitting, by the transmitter, the plurality of repetitions of the PDCCH on the plurality of candidates.

19. The method of item 18, wherein, upon determining that there is insufficient candidate resource available for allocation, the candidates are dropped with granularity of the linked search space sets.

20. The method of item 18, wherein the priority rule comprises determining one of the linked search space sets as a reference search space set, and wherein a priority of the linked search space sets is determined based on an ID of the reference search space set.

21. The method of item 20, wherein a smaller ID of a search space set represents a higher priority.

22. The method of item 20, wherein the reference search space set is one of the linked search space sets with a smaller ID.

23. The method of item 20, wherein the reference search space set is:
one of the linked search space sets for monitoring a candidate with an earlier monitoring occasion; or
one of the linked search space sets corresponding to a smaller starting Physical Resource Block (PRB) number of Control Resource Set (CORESET).

24. The method of item 18, wherein the plurality of candidates are linked as candidate pairs, and upon determining that there is insufficient candidate resource available for allocation, the candidates are dropped with granularity of linked candidate pair.

25. The method of item 24, wherein the candidate pairs are allocated according to their order in a concatenated candidate set according to one of the concatenation schemes comprising:
scheme A, at first level on candidate pair in one aggregation, and second level on aggregation level;
scheme B, at first level on candidate pair in one aggregation, and second level on aggregation level in reverse order; and
scheme C, at first level on aggregation level in reverse order, and second level on candidate pair in one aggregation.

26. The method of item 18, wherein the plurality of candidates are grouped into a plurality of candidate sets; and upon determining that there is insufficient candidate resource available for allocation, the candidates are dropped with granularity based on the candidate sets.

27. The method of item 26, wherein the plurality of candidate sets comprises: a first candidate set comprising a first half of the candidates from each aggregation level of each linked search space set; and a second candidate set comprising a second half of the candidates from each aggregation level of each linked search space set.

28. The method of item 18, wherein the candidates from the linked search space sets are counted jointly.

29. The method of item 28, wherein two counting schemes are provided, including:
a first counting scheme for performing an initial counting of the candidates for resource allocation; and
a second counting scheme for counting the candidates upon determining that, based on the first counting scheme, there is insufficient candidate resource available for allocation.

30. The method of item 28, wherein a configured value, fixed value or UE reported value is used as a counting number for a pair of candidates that are linked for joint counting.

31. The method of item 30, wherein a value that is smaller than the counting number is used as a fallback counting number for a pair of candidates that are linked for joint counting.

32. The method of item 18, wherein it is not expected that, in two linked search space sets, a relatively larger search space set ID is configured for one of the search space sets for monitoring a candidate with an earlier monitoring occasion.

33. The method of item 18, wherein it is expected that two linked search space sets are configured with successive search space set IDs.

34. The method of item 18, wherein a configured value, fixed value or UE reported value is used as a counting number for a candidate of each search space set.

In a further aspect, some items as examples of the disclosure concerning a UE or remote device may be summarized as follows:

35. An apparatus, comprising:
a receiver that receives configurations of a plurality of search space sets that are linked for a Physical Downlink Control Channel (PDCCH) transmission with a plurality of repetitions; wherein the plurality of repetitions of the PDCCH are transmitted on a plurality of candidates; and
a processor that determines, according to a priority rule with a predefined granularity, by counting the candidates from the linked search space sets, whether there is sufficient candidate resource available for allocation;
wherein the processor allocates the candidates, upon determining that there is sufficient candidate resource available for allocation.

36. The apparatus of item 35, wherein, upon determining that there is insufficient candidate resource available for allocation, the candidates are dropped with granularity of the linked search space sets.

37. The apparatus of item 35, wherein the priority rule comprises determining one of the linked search space sets as a reference search space set, and wherein a priority of the linked search space sets is determined based on an ID of the reference search space set.

38. The apparatus of item 37, wherein a smaller ID of a search space set represents a higher priority.

39. The apparatus of item 37, wherein the reference search space set is one of the linked search space sets with a smaller ID.

40. The apparatus of item 37, wherein the reference search space set is:
one of the linked search space sets for monitoring a candidate with an earlier monitoring occasion; or
one of the linked search space sets corresponding to a smaller starting Physical Resource Block (PRB) number of Control Resource Set (CORESET).

41. The apparatus of item 35, wherein the plurality of candidates are linked as candidate pairs, and upon determining that there is insufficient candidate resource available for allocation, the candidates are dropped with granularity of linked candidate pair.

42. The apparatus of item 41, wherein the candidate pairs are allocated according to their order in a concatenated candidate set according to one of the concatenation schemes comprising:
scheme A, at first level on candidate pair in one aggregation, and second level on aggregation level;
scheme B, at first level on candidate pair in one aggregation, and second level on aggregation level in reverse order; and
scheme C, at first level on aggregation level in reverse order, and second level on candidate pair in one aggregation.

43. The apparatus of item 35, wherein the plurality of candidates are grouped into a plurality of candidate sets; and upon determining that there is insufficient candidate resource available for allocation, the candidates are dropped with granularity based on the candidate sets.

44. The apparatus of item 43, wherein the plurality of candidate sets comprises: a first candidate set comprising a first half of the candidates from each aggregation level of each linked search space set; and a second candidate set comprising a second half of the candidates from each aggregation level of each linked search space set.

45. The apparatus of item 35, wherein the candidates from the linked search space sets are counted jointly.

46. The apparatus of item 45, wherein two counting schemes are provided, including:

a first counting scheme for performing an initial counting of the candidates for resource allocation; and
a second counting scheme for counting the candidates upon determining that, based on the first counting scheme, there is insufficient candidate resource available for allocation.

47. The apparatus of item 45, wherein a configured value, fixed value or UE reported value is used as a counting number for a pair of candidates that are linked for joint counting.

48. The apparatus of item 47, wherein a value that is smaller than the counting number is used as a fallback counting number for a pair of candidates that are linked for joint counting.

49. The apparatus of item 35, wherein it is not expected that, in two linked search space sets, a relatively larger search space set ID is configured for one of the search space sets for monitoring a candidate with an earlier monitoring occasion.

50. The apparatus of item 35, wherein it is expected that two linked search space sets are configured with successive search space set IDs.

51. The apparatus of item 35, wherein a configured value, fixed value or UE reported value is used as a counting number for a candidate of each search space set.

In a yet further aspect, some items as examples of the disclosure concerning a NE or gNB may be summarized as follows:

52. An apparatus comprising:
a transmitter that transmits configurations of a plurality of search space sets that are linked for a Physical Downlink Control Channel (PDCCH) transmission with a plurality of repetitions; wherein the plurality of repetitions of the PDCCH are to be transmitted on a plurality of candidates; and
a processor that determines, according to a priority rule with a predefined granularity, by counting the candidates from the linked search space sets, whether there is sufficient candidate resource available for allocation;
wherein the processor allocates the candidates, upon determining that there is sufficient candidate resource available for allocation; and
wherein the transmitter transmits the plurality of repetitions of the PDCCH on the plurality of candidates.

53. The apparatus of item 52, wherein, upon determining that there is insufficient candidate resource available for allocation, the candidates are dropped with granularity of the linked search space sets.

54. The apparatus of item 52, wherein the priority rule comprises determining one of the linked search space sets as a reference search space set, and wherein a priority of the linked search space sets is determined based on an ID of the reference search space set.

55. The apparatus of item 54, wherein a smaller ID of a search space set represents a higher priority.

56. The apparatus of item 54, wherein the reference search space set is one of the linked search space sets with a smaller ID.

57. The apparatus of item 54, wherein the reference search space set is:
one of the linked search space sets for monitoring a candidate with an earlier monitoring occasion; or
one of the linked search space sets corresponding to a smaller starting Physical Resource Block (PRB) number of Control Resource Set (CORESET).

58. The apparatus of item 52, wherein the plurality of candidates are linked as candidate pairs, and upon determining that there is insufficient candidate resource available for allocation, the candidates are dropped with granularity of linked candidate pair.

59. The apparatus of item 58, wherein the candidate pairs are allocated according to their order in a concatenated candidate set according to one of the concatenation schemes comprising:
scheme A, at first level on candidate pair in one aggregation, and second level on aggregation level;
scheme B, at first level on candidate pair in one aggregation, and second level on aggregation level in reverse order; and
scheme C, at first level on aggregation level in reverse order, and second level on candidate pair in one aggregation.

60. The apparatus of item 52, wherein the plurality of candidates are grouped into a plurality of candidate sets; and upon determining that there is insufficient candidate resource available for allocation, the candidates are dropped with granularity based on the candidate sets.

61. The apparatus of item 60, wherein the plurality of candidate sets comprises: a first candidate set comprising a first half of the candidates from each aggregation level of each linked search space set; and a second candidate set comprising a second half of the candidates from each aggregation level of each linked search space set.

62. The apparatus of item 52, wherein the candidates from the linked search space sets are counted jointly.

63. The apparatus of item 62, wherein two counting schemes are provided, including:
a first counting scheme for performing an initial counting of the candidates for resource allocation; and
a second counting scheme for counting the candidates upon determining that, based on the first counting scheme, there is insufficient candidate resource available for allocation.

64. The apparatus of item 62, wherein a configured value, fixed value or UE reported value is used as a counting number for a pair of candidates that are linked for joint counting.

65. The apparatus of item 64, wherein a value that is smaller than the counting number is used as a fallback counting number for a pair of candidates that are linked for joint counting.

66. The apparatus of item 52, wherein it is not expected that, in two linked search space sets, a relatively larger search space set ID is configured for one of the search space sets for monitoring a candidate with an earlier monitoring occasion.

67. The apparatus of item 52, wherein it is expected that two linked search space sets are configured with successive search space set IDs.

68. The apparatus of item 52, wherein a configured value, fixed value or UE reported value is used as a counting number for a candidate of each search space set.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. A method, comprising:
receiving configurations of search space sets that are linked for a physical downlink control channel (PDCCH) transmission with a plurality of repetitions that are transmitted on candidates;
determining, according to a priority rule with a predefined granularity, by counting the candidates from the linked search space sets, whether there is sufficient candidate resource available for allocation; and
allocating the candidates based on the determining that there is the sufficient candidate resource available for allocation.

2. The method of claim 1, wherein, based on the determining that there is insufficient candidate resource available for allocation, the candidates are dropped with a granularity of the linked search space sets.

3. The method of claim 1, wherein the priority rule comprises one of the linked search space sets as a reference search space set, and wherein a priority of the linked search space sets is determined based on an identifier (ID) of the reference search space set.

4. The method of claim 3, wherein a smaller ID of a search space set represents a higher priority.

5. The method of claim 3, wherein the reference search space set is one of the linked search space sets with a smaller ID.

6. The method of claim 1, wherein the candidates are linked as candidate pairs, and based on the determining that there is insufficient candidate resource available for allocation, the candidates are dropped with granularity of a linked candidate pair.

7. The method of claim 6, wherein the candidate pairs are allocated according to an order in a concatenated candidate set according to one of multiple concatenation schemes comprising:
a first scheme at a first level on a candidate pair in one aggregation, and a second level on an aggregation level;
a second scheme at the first level on the candidate pair in the one aggregation, and the second level on the aggregation level in a reverse order; or
a third scheme at the first level on the aggregation level in the reverse order, and the second level on the candidate pair in the one aggregation.

8. The method of claim 1, wherein the candidates from the linked search space sets are counted jointly.

9. The method of claim 1, wherein two of the linked search space sets are configured with successive search space set identifiers (IDs).

10. A user equipment (UE) for wireless communication, comprising:
at least one memory; and
at least one processor coupled with the at least one memory and configured to cause the UE to:
receive configurations of search space sets that are linked for a physical downlink control channel (PDCCH) transmission with a plurality of repetitions that are transmitted on candidates; and
allocate the candidates based on a determination that there is sufficient candidate resource available for allocation, the determination according to a priority rule with a predefined granularity, and by counting the candidates from the linked search space sets.

11. The UE of claim 10, wherein, based on a determination that there is insufficient candidate resource available for allocation, the candidates are dropped with a granularity of the linked search space sets.

12. The UE of claim 10, wherein the priority rule comprises one of the linked search space sets as a reference search space set, and wherein a priority of the linked search space sets is determined based on an identifier (ID) of the reference search space set.

13. The UE of claim 12, wherein a smaller ID of a search space set represents a higher priority.

14. The UE of claim 12, wherein the reference search space set is one of the linked search space sets with a smaller ID.

15. The UE of claim 10, wherein the candidates are linked as candidate pairs, and based on a determination that there is insufficient candidate resource available for allocation, the candidates are dropped with granularity of a linked candidate pair.

16. The UE of claim 14, wherein the candidate pairs are allocated according to an order in a concatenated candidate set according to one of multiple concatenation schemes comprising:
a first scheme at a first level on a candidate pair in one aggregation, and a second level on an aggregation level;
a second scheme at the first level on the candidate pair in the one aggregation, and the second level on the aggregation level in a reverse order; or
a third scheme at the first level on the aggregation level in the reverse order, and the second level on the candidate pair in the one aggregation.

17. The UE of claim 10, wherein the candidates from the linked search space sets are counted jointly.

18. The UE of claim 10, wherein two of the linked search space sets are configured with successive search space set identifiers (IDs).

19. A processor for wireless communication, comprising:
at least one controller coupled with at least one memory and configured to cause the processor to:
receive configurations of search space sets that are linked for a physical downlink control channel (PDCCH) transmission with a plurality of repetitions that are transmitted on candidates; and
allocate the candidates based on a determination that there is sufficient candidate resource available for allocation, the determination according to a priority rule with a predefined granularity, and by counting the candidates from the linked search space sets.

20. A network equipment (NE) for wireless communication, comprising:
at least one memory; and
at least one processor coupled with the at least one memory and configured to cause the NE to:
transmit configurations of search space sets that are linked for a physical downlink control channel (PDCCH) transmission with a plurality of repetitions that are to be transmitted on candidates;
allocate the candidates based on a determination that there is sufficient candidate resource available for allocation, the determination according to a priority rule with a predefined granularity, and by counting the candidates from the linked search space sets; and
transmit the plurality of repetitions of the PDCCH on the candidates.

* * * * *